United States Patent Office 3,763,089
Patented Oct. 2, 1973

3,763,089
STABILIZER SYSTEM FOR STEREOREGULAR RUBBERS
Robert W. Layer, Cuyahoga Falls, Ohio, assignor to The B. F. Goodrich Company, New York, N.Y.
No Drawing. Filed Sept. 30, 1970, Ser. No. 77,050
Int. Cl. C08c 11/44, 11/52
U.S. Cl. 260—45.8 N                                    10 Claims

ABSTRACT OF THE DISCLOSURE

Stereoregular rubbers are effectively stabilized against oxidative and thermal degradation by the addition of small amounts of a thioamido compound and an amine compound. The combination of thioamido ad amine compounds behave synergistically.

BACKGROUND OF THE INVENTION

Stereoregular rubbers such as synthetic natural rubber and cis-polybutadiene are commonly subjected to elevated temperatures during processing to obtain the rubber in suitable form for shipping. Processing of the rubber generally includes one or more drying operations at temperatures of 165° F. or higher to obtain a rubber crumb acceptable for baling. When exposed to such temperatures the rubber discolors so that it is no longer useful for certain applications requiring a white stock. Even more detrimental to the rubber is the oxidative and thermal deterioration of the rubber during such processing. Degradation of the polymer results in a marked decrease in physical properties and, in instances of severe breakdown of the molecular composition, the rubber softens to a point that it is a useless liquid. Degradation can even occur during shipment since the rubber is formed into bales while it is hot and the interior portions of the bales retain this heat for as long as several days. Rubber that has degraded must be discarded, resulting in considerable economic loss to the manufacturer.

It is essential in order to obtain a useful end product that the stereoregular rubbers be stabilized after polymerization and before processing and shipment in order to prevent, or at least minimize, oxidative and thermal degradation. Hindered phenols such as di-t-butyl-p-cresol have typically been used for this purpose. It would be highly advantageous if a more effective stabilizer system was available which would permit the use of a smaller amount of stabilizer to obtain the same degree of stabilization. This would result in considerable savings.

SUMMARY OF THE INVENTION

We have now unexpectedly found a unique stabilizer system useful for the prevention of oxidative and thermal degradation of stereoregular rubbers. The stabilizer is comprised of a thioamido compound and an amine and is more effective than either component of the combination when employed individually at the same level and is also more effective than phenolic stabilizers presently employed. The stabilizer system of this invention may therefore be employed at low levels so that a considerable economic saving will result.

The stereoregular rubbers stabilized are homopolymers of conjugated diolefins such as butadiene and isoprene. The thioamido compounds employed are compounds containing a

molecular grouping. Imidazolidinethiones, thioamides and thioureas are especially useful thioamido compounds for the purposes of the present invention. The amine will be any amine compound wherein the amine nitrogen atom contains at least one available hydrogen atom and is additionally substituted with at least one aryl group. For effective stabilization the thioamido compound will be present in the rubber from about 0.01 to 2.5 parts per 100 parts rubber with about 0.01 to 2.5 parts per 100 parts rubber of the amine compound. The total amount of stabilizer will generally not exceed about 3 parts per 100 parts rubber.

DETAILED DESCRIPTION

The present stabilizer system is effective for the prevention of thermal and oxidative degradation in rubbers. Synergistic activity is obtained when a thioamido compound is combined with an amine for the stabilization of the stereoregular rubbers.

The rubber compositions effectively stabilized in accordance with the present invention are stereoregular rubbers, particularly, homopolymers derived from conjugated diolefins. The conjugated diolefins employed will typically contain 4 to 6 carbon atoms and include 1,3-butadiene, isoprene, piperylene, 2,3-dimethylbutadiene-1,3 and 2-methylpentadiene-1,3. Homopolymers of butadiene and isoprene wherein the polymer contains at least 80% 1,4-addition product have shown excellent stability with the present stabilizers. The present stabilizers are particularly valuable for use with stereoregular polymers comprised of 95–100% of the 1,4-addition product which has predominantly one stereo configuration (cis- or trans-). The polymers may be obtained by any conventional known polymerization technique for obtaining stereo rubbers such as polymerization with lithium-based catalysts or Ziegler catalysts.

Although the present stabilizers are most useful for the prevention of oxidative and thermal degradation in stereo rubbers they may also be advantageously employed with other polymer compositions containing unsaturation in the polymer chain. Such polymer compositions include copolymers of conjugated diolefins such as styrene-butadiene copolymer, butadiene-acrylonitrile copolymers or copolymers derived predominantly from conjugated diolefins which contain minor amounts of a lower alkyl acrylate or methacrylate. Still other polymers such as ethylene-propylene-diene terpolymers, which are susceptible to oxidative and thermal degradation, may also be effectively stabilized with the stabilizer system of this invention.

The method of preparation of the stereoregular polymers is not critical. The rubbers will be effectively stabilized with the thioamido and amine combination irrespective of the manner of polymerization, that is, whether the monomers are polymerized in an emulsion, in solution or in bulk. Any of the various catalysts employed to obtain stereoregular polymers and which are known to those skilled in the art may be employed. For example, a lithium catalyst, typically metallic lithium or an organo-lithium compound, or a Ziegler-type catalyst such as obtained by mixing certain organoaluminum compounds with a transition metal compound are useful for the production of stereo rubbers. Polymerization temperatures and techniques may be varied in accordance with well established principles.

The stabilizer system of this invention is added to the polymer after completion of the polymerization. It may be added while the polymer is in solution or emulsion as obtained from the polymerizer or it may be incorporated in the polymer by milling, kneading or similar treatment after the polymer has been recovered from the polymerization medium. The stabilizer may be added per se, in solution or as a finely divided dispersion. It is often advantageous to remove as much catalyst residue from the polymer as practical prior to addition of the stabilizer. This may be done by washing or by converting the catalyst residues to an inert form.

The stabilizer system of the present invention is comprised of a thioamido compound and an amine compound. Thioamido compounds contain one or more molecular groupings of the formula $$-\underset{\|}{\overset{S}{C}}-\underset{|}{\overset{H}{N}}-$$

The thioamido group may be incorporated in either a linear or cyclic molecular configuration. Especially useful thioamido compounds include thioamides, thioureas and certain heterocyclic compounds selected from the group imidazolidinethiones, ω-thiocaprolactams, and mercaptoimidazolones, mercaptopyrimidines and thiobarbituric acids the latter compounds containing the $$-\underset{\|}{\overset{S}{C}}-\underset{|}{\overset{H}{N}}-$$

group as a result of tautomerization. Useful thioamides will have the structural formula $$R-\underset{\|}{\overset{S}{C}}-\underset{|}{\overset{H}{N}}-R_1$$

wherein R is a hydrocarbon radical containing from 1 to 20 carbon atoms such as an alkyl, cycloalkyl, aryl, aralkyl or alkaryl group and $R_1$ is hydrogen or a hydrocarbon radical the same as defined for R. Especially useful hydrocarbon radicals of the above type include alkyl radicals containing from 1 to 8 carbon atoms, cycloalkyl groups containing 5 or 6 carbon atoms, phenyl, benzyl and tolyl. Compounds of the above type include thioacetamide, thioacetamilide, thiobenzanilide and the like.

Thiourea compounds will correspond to the formula $$\underset{|}{\overset{R_4}{\phantom{X}}}\;\underset{\|}{\overset{S}{\phantom{X}}}\;\underset{|}{\overset{H}{\phantom{X}}}$$
$$R_3-N-C-N-R_2$$

wherein $R_2$, $R_3$ and $R_4$ are, independently, hydrogen or a hydrocarbon radical as defined for $R_1$. $R_2$ may also be an amine function or substituted amine so that the resulting thioamido compound is thiosemicarbazide or a substituted thiosemicarbazide. Typical thioureas include thiocarbanilide, 2,2'-dimethylthiocarbanilide, 1,3-dibenzyl-2-thiourea, N,N'-di-n-butylthiourea, N,N'-di-isopropylthiourea, N,N'-di-t-butylthiourea, N,N,N'-tri-n-butylthiourea, and the like.

Heterocyclic compounds containing a $$-\underset{\|}{\overset{S}{C}}-\underset{|}{\overset{H}{N}}-$$

grouping in the ring are also useful thioamido compounds for the purpose of the present invention. Such heterocyclic compounds include imidazolidine thiones, ω-thiocaprolactams, thiobarbituric acids, mercaptoimidazolines and mercaptopyrimidines. Imidazolidinethiones will have the formula

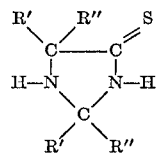

wherein R' and R'' are, independently, hydrogen or an alkyl radical containing from 1 to 12 carbon atoms or bivalent radicals forming a 5- or 6-membered cyclic system which may contain up to 20 carbon atoms when substituted with one or more alkyl groups. The imidazolidinethiones are more completely described in U.S. Pat. No. 3,205,195.

Certain heterocyclic compounds capable of undergoing tautomerization, that is, $$-N=\underset{|}{\overset{SH}{C}}- \rightleftarrows -\underset{|}{\overset{H}{N}}-\underset{\|}{\overset{S}{C}}-$$

will also be employed to obtain the useful stabilizers of the present invention. Such compounds include 2-mercaptoimidazolines and alkyl-substituted 2-mercaptoimidazolines; 2-mercaptopyrimidines and substituted 2-mercaptopyrimidines; and thiobarbituric acid and derivatives thereof.

The amine compound employed with the thioamido compound to obtain effective stabilizers will be any amine antioxidant wherein the amine nitrogen atom contains at least one hydrogen atom and which is additionally substituted with at least one aryl group. More preferably, the amine compounds will have the formula

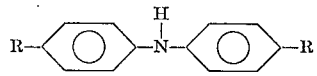

wherein R is hydrogen, an amino, alkoxy or hydroxy group, an alkyl group containing from 1 to 12 carbon atoms, an aryl group, an aralkyl group or an alkaryl group containing from 7 to 24 carbon atoms. The amine function may also be part of a cyclic system, such as with the dihydroquinolines and like compounds. In the above formula the aryl substituent may additionally contain other amine functions so that the resulting compound is a polyamine. Particularly useful amine antioxidants employed include p,p-diaminodiphenylmethane; N-phenyl-α-naphthylamine; N-phenyl-β-naphthylamine (PBNA); p-isopropoxydiphenylamine; N,N' - diphenyl-p-phenylenediamine; N,N'-di-β-naphthyl-p-phenylenediamine; N-cyclohexyl-N'-phenyl - p - phenylenediamine; monooctyldiphenylamine and dioctylphenylamine and mixtures thereof; N,N'-diphenylethylenediamine; N,N'-disalicylal ethylenediamine; mixtures of N-phenyl-α-naphthylamine and 2,4-di-aminotoluene; mixtures of N,N'-diphenylethylenediamine and N,N'-diphenyl-p-phenylenediamine; condensation products of diphenylamine and acetone; 6-ethoxy-2,2,4-trimethyl - 1,2 - dihydroquinoline; monomeric and polymeric 2,4,5-trimethyl-1,2-dihydroquinolines; and the like; and mixtures thereof.

The synergistic stabilizer combination will not generally exceed about 3 parts per 100 parts of the rubber. The thioamido compound will be employed from about 0.01 to 2.5 parts per 100 parts rubber, and more preferably from about 0.25 to 1 part. The amine compound will range between about 0.01 and 2.5 parts per 100 parts rubber and more preferably from about 0.25 to 2 parts of the rubber.

The following examples serve to illustrate the invention more fully. In the examples and tables parts and percentages are reported on a weight basis.

Example I

Synthetic natural rubber obtained by the solution polymerization of isoprene and containing 99% cis-1,4-addition product and 0.8% trans-1,4-addition product was stabilized in accordance with the present invention. Samples of the synthetic natural rubber which had been recoagulated were stabilized by the addition of a variety of thioamide and thiourea compounds with an octylated diphenylamine stabilizer. The amine was a mixture of mono- and di-octyldiphenylamines. The stabilizer components were rapidly milled into the rubber at 140° F. to avoid excessive mastication. Stabilizer efficiency was then determined by measuring the Mooney viscosity decrease (10 minutes at 212° F.) after 10 days of aging at 70° C. In the tables the stabilizer efficiency is reported as the percent drop in Mooney viscosity based on the original Mooney viscosity obtained for the unaged sample. Table I sets out the results obtained with the various stabilizers. In Table I the thioamide and thiourea compounds correspond, respectively, to the formulae:

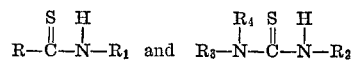

TABLE I

| Sample | Thioamido compound (parts) | Mono- and di- octyldi- phenyl- amine (parts) | Percent Mooney decrease |
|---|---|---|---|
| A | Thioamide; R=methyl, R₁=phenyl (1) | 1 | 2 |
| B | Thioamide; R=methyl, R₁=hydrogen (1) | 1 | 0 |
| C | Thioamide; R=R₁=phenyl (0.5) | 1 | 0 |
| D | Thiourea; R₃=R₂=phenyl, R₄=hydrogen (1) | 1 | 0 |
| E | Thiourea; R₂=R₃=tolyl, R₄=hydrogen (1) | 1 | 2 |
| F | Thiourea; R₂=R₃=benzyl, R₄=hydrogen (1) | 1 | 11 |
| G | Thiourea; R₃=R₄=hydrogen, R₂=NH₂ (0.5) | 1 | 0 |
| H | Thiourea; R₂=R₃=n-butyl, R₄=hydrogen (0.5) | 0.5 | 0 |
| I | Thiourea; R₂=R₃=isobutyl, R₄=hydrogen (0.5) | 0.5 | 6 |
| J | Thiourea; R₂=R₃=t-butyl, R₄=hydrogen (0.5) | 0.5 | 9 |
| K | Thiourea; R₂=phenyl, R₃ and R₄= [(CH₂)₄] (0.5) | 1 | 0 |
| L | None | 1 | 30 |
| M | Thiourea; R₂=R₃=tolyl, R₄=hydrogen (1) | None | 38 |
| Control | →1 part di-t-butyl-p-cresol | | 20 |

Example II

Employing the synthetic natural rubber of Example I a series of stabilizer compositions were evaluated by measuring the decrease in Mooney viscosity after 10 days aging at 70° C. The amine compound employed was a mixture of mono- and di-octylphenylamines and the thioamido compounds were various heterocyclic compounds. The results obtained from these tests are set forth in Table II.

TABLE II

| Sample | Thioamido compound (parts) | Mono- and di- octyldi- phenyl- amine (parts) | Percent Mooney decrease |
|---|---|---|---|
| A | 2-mercaptoimidazole (0.5) | 1 | 2 |
| B | Thiobarbituric acid (0.5) | 1 | 0 |
| C | ω-Thiocaprolactam (0.5) | 0.5 | 0 |
| D | 2-hydroxy-2-mercapto-6-propyl pyrimidine (0.5) | 0.5 | 12 |
| E | 2,5-diethyl-2,5-dimethyl-4-imidazolidinethione (0.3) | 1 | 5 |
| F | 2,10-dimethyl-7,14-diazadispiro[5.1.5.2]pentadecane-15-thione (0.3) | 1 | 8 |
| G | None | 1 | 30 |

Example III 7,14 - diazadispiro[5.1.5.2]pentadecane - 15 - thione (hereinafter abbreviated DPT) was employed with various amine compounds to stabilize synthetic rubber (99% cis-1,4). The stabilized compositions were tested in accordance with the previously described procedure and the results are set forth in Table III.

TABLE III

| Sample | Amine (parts) | DDPT (parts) | Percent Mooney decrease |
|---|---|---|---|
| A | p,p'-Bis-α,α-dimethylbenzyl diphenylamine (0.5) | 0.5 | |
| B | do | 0.25 | 10 |
| C | p,p'-Bis-α,α-dimethylbenzyl diphenylamin (0.25) | 0.25 | 10 |
| D | p,p'-Bis-α,α-dimethylbenzyl diphenylamine (1) | 0.25 | 8 |
| E | N,N'-di(2-naphthyl)p-phenylenediamine (0.5) | 0.5 | 8 |
| F | Condensation product diphenylamine, acetone (0.5) | 0.5 | 0 |
| G | Polymeric 2 2,4-trimethyl-1,2-dihydroquinoline (0.5) | 0.5 | 0 |
| H | Di-octyl diphenylamine (0.5) | 0.5 | 6 |
| I | None | 1.0 | 37 |
| J | p,p'-Bis-α,α-dimethylbenzyl diphenylamine (1) | None | 26 |
| K | Polymeric 2,2 4-trimethyl-1,2-dihydroquinoline (1) | None | 16 |
| L | N,N'-di(2-naphthyl)-p-phenylenediamine (1) | None | 20 |
| M | Di-octyldiphenylamine (1) | None | 30 |

Example IV

Cis-polybutadiene rubber (99% cis-1,4) containing 37.5 parts oil was stabilized with 1.4 parts polymeric 2,2,4-trimethyl-1,2-dihydroquinoline (Sample A) and a second portion (Sample B) stabilized with a stabilizer mixture comprising 0.5 part, 7,14-diazadispirol[5.1.5.2] pentadecane-15-thione and 0.75 part polymeric 2,4,4-trimethyl-1,2-dihydroquinoline. Both samples were then subjected to air oven aging at 70° C. and the Mooney viscosities (ML 4' at 212° F.) measured each day. Despite the fact that Sample A contained a greater amount of stabilizer than Sample B, the A sample showed a 35% drop in Mooney viscosity after only 3 days, whereas the sample stabilized in accordance with this invention aged for 10 days before achieving the same reduction in Mooney viscosity.

Example V

A synthetic natural rubber containing 99% cis-1,4 structure was reprecipitated after polymerization. The resulting rubber containing 10 parts per million iron contamination was extended with 5 parts oil and then stabilized by the addition of 0.25 part 7,14-diazadispiro [5.1.5.2]pentadecane-15-thone and 0.25 part p,p'-bis-α,α-dimethylbenzyldiphenylamine. After 10 days air oven aging at 70° C. the Mooney viscosity (ML 10' at 212° F.) of the stabilized sample dropped 22%. An identical rubber sample containing 1 part 7,14-diazadispiro[5.1.5.2] pentadecane-15-thione but no amine showed a 36% decrease in Mooney viscosity under identical testing.

Example VI

To demonstrate the utility of polymers stabilized in accordance with the present invention, the synthetic natural ruber of Example III, Sample C, was compounded as follows:

| | Parts |
|---|---|
| Stabilized Rubber IIIC | 100 |
| HAF black | 25 |
| Stearic acid | 2 |
| Zinc oxide | 3 |
| Sulfur | 2 |
| Sulfenamide accelerator | 0.8 |

The resulting rubber after curing at 293° F. for 45 minutes had an ultimate tensile strength of 4000 p.s.i., an ultimate elongation of 680% and a 300% modulus of 700 p.s.i.

From the foregoing examples it is evident that the combination of a thioamido compound with an amine in stereoregular polymers provides very effective stabilization against thermal and oxidative degradation. It has also been shown that a wide variety of thioamido compounds and amine compounds may be successfully employed. Synergistic activity in stereo rubbers has been demonstrated with the present stabilizer compositions.

I claim:

1. A stabilized stereoregular composition comprising (A) a stereoregular rubber derived from conjugated diolefins containing 4 to 6 carbon atoms; (B) from about 0.01 to about 2.5 parts per 100 parts rubber of a thioamido compound selected from the group consisting of N-phenylphenylthioamide, N-methylphenylthioamide, thiobarbituric acid, and ω-thiocaprolactam, and (C) 0.01 to 2.5 parts per 100 parts rubber of an amine compound selected from the group consisting of diphenyl amines of the formula

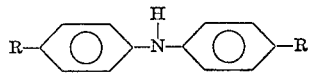

wherein R is selected from the group consisting of hydrogen, an amine radical, a hydroxy radical, an alkoxy radical, an alkyl radical containing 1 to 12 carbon atoms, and an aryl, alkaryl, and aralkyl group containing 6 to 24 carbon atoms; condensation products of diphenylamine and acetone, and 2,2,4-trimethyl-1,2-dihydroquinoline and polymers thereof.

2. A stabilized stereoregular composition of claim 1 wherein the stereoregular rubber is a homopolymer derived from 1,3-butadiene or isoprene and contains at least 80 percent by weight of 1,4-addition product.

3. A stabilized stereoregular composition of claim 2 wherein the stabilizer combination (B+C) does not exceed about 3 parts per 100 parts rubber.

4. A stabilized stereoregular composition of claim 3 wherein the amine compound is a diphenylamine wherein R is selected from the group consisting of hydrogen, an alkyl radical containing 1 to 12 carbon atoms, and an aryl, alkaryl, and aralkyl radical containing 7 to 24 carbon atoms, and is present in from about 0.25 to about 1 part per 100 parts rubber.

5. A stabilized stereoregular composition of claim 4 wherein the thioamide is N-Phenylphenylthioamide and the amine is a mixture of mono- and di(octylphenyl) amine.

6. A stabilized stereoregular composition of claim 4 wherein the thioamido compound is thiobarbituric acid and is present in from about 0.25 to 1 part per 100 parts rubber, and the amine is a mixture of mono- and di(octylphenyl)amine.

7. A stabilized stereoregular composition of claim 4 wherein the thioamido compound is ω-thiocaprolactam and is present in from about 0.25 to 1 part per 100 parts rubber, and the amine is a mixture of mono- and di(octylphenyl)amine.

8. A stabilized stereoregular composition of claim 4 wherein the thioamido compound is N-methylphenylthioamide and the amine is a mixture of mono- and di(octylphenyl)amine.

9. A stabilized stereoregular composition comprising (A) a stereoregular rubber derived from conjugated di-olefins containing 4 to 6 carbon atoms, (B) thiobarbituric acid, and (C) 0.01 to 2.5 parts per 100 parts rubber of an amine compound selected from the group consisting of diphenyl amines of the formula

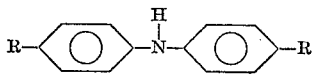

wherein R is selected from the group consisting of hydrogen, an amine radical, a hydroxy radical, an alkoxy radical, an alkyl radical containing 1 to 12 carbon atoms, and an aryl, alkaryl, and aralkyl group containing 6 to 24 carbon atoms; condensation products of diphenylamine and acetone; and 2,2,4-trimethyl-1,2-dihydroquinoline and polymers thereof.

10. A stabilized stereoregular composition comprising (A) a stereoregular rubber derived from conjugated di-olefins containing 4 to 6 carbon atoms, (B) ω-thiocaprolactam, and (C) 0.01 to 2.5 parts per 100 parts rubber of an amine compound selected from the group consisting of diphenyl amines of the formula

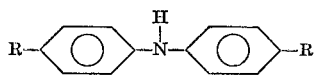

wherein R is selected from the group consisting of hydrogen, an amine radical, a hydroxy radical, an alkoxy radical, an alkyl radical containing 1 to 12 carbon atoms, and an aryl, alkaryl, and aralkyl group containing 6 to 24 carbon atoms; condensation products of diphenylamine and acetone; and 2,2,4-trimethyl-1,2-dihydroquinoline and polymers thereof.

References Cited
UNITED STATES PATENTS

| | | | |
|---|---|---|---|
| 3,178,402 | 4/1965 | Smith et al. | 260—94.2 |
| 3,188,297 | 6/1965 | Snyder et al. | 260—33.6 |
| 2,266,601 | 12/1941 | Howland | 260—808 |
| 2,747,978 | 5/1956 | Closson et al. | 260—45.9 |
| 2,373,049 | 4/1945 | Pedersen | 260—801 |
| 3,205,195 | 9/1965 | Cook | 260—45.8 |
| 3,452,056 | 6/1969 | Sundholm | 260—45.9 |
| 3,392,142 | 7/1968 | Leyland et al. | 260—45.8 |
| 2,375,042 | 5/1945 | Semon | 260—45.9 |
| 2,460,177 | 1/1949 | Howland | 260—799 |
| 2,444,881 | 7/1948 | Sterrett | 260—45.9 |
| 2,396,156 | 3/1946 | Clarkson | 260—45.9 |
| 2,651,620 | 9/1953 | Hill et al. | 260—45.9 |
| 2,751,370 | 6/1956 | Roussell | 260—45.8 |
| 2,864,803 | 12/1958 | Jones | 260—45.8 |
| 2,955,100 | 10/1960 | Hill et al. | 260—45.8 |
| 3,024,218 | 3/1962 | Stevens | 260—45.9 |
| 3,163,616 | 12/1964 | Stahly | 260—28.5 |
| 3,341,491 | 9/1967 | Robinson et al. | 260—45.75 |
| 3,347,677 | 10/1967 | Jaworski et al. | 99—2 |
| 3,384,615 | 5/1968 | Agouri et al. | 260—45.9 |
| 2,582,695 | 1/1952 | Harman | 260—803 |
| 3,010,912 | 11/1961 | Hardman | 252—405 |
| 3,244,683 | 4/1966 | Kline | 260—88.3 |

OTHER REFERENCES

"Compounding Ingredients for Rubber," third edition, 1961, pp. 117 and 118.

DONALD E. CZAJA, Primary Examiner

R. A. WHITE, Assistant Examiner

U.S. Cl. X.R.

260—45.9 R